(12) United States Patent
Jenkins

(10) Patent No.: US 7,624,161 B1
(45) Date of Patent: *Nov. 24, 2009

(54) METHOD AND APPARATUS FOR EMAIL PROGRAMMING ACROSS A COMPUTER NETWORK

(75) Inventor: Jimmy J. Jenkins, Sparks, NV (US)

(73) Assignee: Open Invention Network, LLC, Durham, NC (US)

( * ) Notice: Subject to any disclaimer, the term of this patent is extended or adjusted under 35 U.S.C. 154(b) by 10 days.

This patent is subject to a terminal disclaimer.

(21) Appl. No.: 11/619,163

(22) Filed: Jan. 2, 2007

Related U.S. Application Data

(63) Continuation of application No. 10/720,556, filed on Nov. 24, 2003, now Pat. No. 7,162,519, which is a continuation of application No. 10/112,583, filed on Mar. 29, 2002, now Pat. No. 6,678,723, which is a continuation of application No. 09/071,751, filed on May 1, 1998, now Pat. No. 6,401,114.

(60) Provisional application No. 60/045,261, filed on May 1, 1997.

(51) Int. Cl.
   *G06F 15/16* (2006.01)
(52) U.S. Cl. ...................... 709/219; 709/217
(58) Field of Classification Search ................ 709/219, 709/217, 203
   See application file for complete search history.

(56) References Cited

U.S. PATENT DOCUMENTS

| | | | |
|---|---|---|---|
| 4,558,413 A | 12/1985 | Schmidt et al. | |
| 4,809,170 A | 2/1989 | Leblang et al. | |
| 4,949,248 A | 8/1990 | Caro | |
| 4,951,192 A | 8/1990 | Chase, Jr. et al. | |
| 5,301,326 A | 4/1994 | Linnett et al. | |
| 5,325,534 A | 6/1994 | Galy et al. | |
| 5,390,330 A | 2/1995 | Talati | |
| 5,410,703 A | 4/1995 | Nilssone et al. | |
| 5,421,017 A | 5/1995 | Scholz et al. | |
| 5,423,042 A | 6/1995 | Jalili et al. | |
| 5,475,819 A | 12/1995 | Miller et al. | |
| 5,550,981 A | 8/1996 | Bauer et al. | |
| 5,557,748 A | 9/1996 | Norris | |
| 5,587,935 A | 12/1996 | Brooks et al. | |
| 5,640,567 A | 6/1997 | Phipps | |
| 5,675,805 A | 10/1997 | Boldo et al. | |
| 5,682,468 A | 10/1997 | Fortenbery et al. | |
| 5,689,711 A | 11/1997 | Bardasz et al. | |
| 5,724,589 A | 3/1998 | Wold | |
| 5,734,828 A | 3/1998 | Pendse et al. | |

(Continued)

*Primary Examiner*—Krisna Lim
(74) *Attorney, Agent, or Firm*—Williams Mullen; Gregory A. Stephens

(57) ABSTRACT

A method of building and assembling programs across computer networks that is dictated by the user to perform logical work without the user using a compiler. Users are able to assemble programs over a network by defining or re-defining which logical components are bound into the overall program without the use of a compiler. Logical components are called and bound into the program at run time, allowing dynamic programming which may be modified at any time without re-compiling the entire program. Each logical component can act independently of other logical components or work in concert with each other. This allows assembly of a program, even though some components may be created using totally different methodologies and/or are constructed by different programmers.

12 Claims, 7 Drawing Sheets

U.S. PATENT DOCUMENTS

| | | |
|---|---|---|
| 5,745,888 A | 4/1998 | Bauer et al. |
| 5,754,772 A | 5/1998 | Leaf |
| 5,761,673 A | 6/1998 | Bookman et al. |
| 5,835,712 A | 11/1998 | DuFresne |
| 5,887,172 A | 3/1999 | Vasudevan et al. |
| 5,893,106 A | 4/1999 | Brobst et al. |
| 5,930,513 A | 7/1999 | Taylor |
| 5,944,784 A | 8/1999 | Simonoff et al. |
| 5,983,227 A | 11/1999 | Nazem et al. |
| 6,049,831 A | 4/2000 | Gardell et al. |
| 6,081,837 A | 6/2000 | Stedman et al. |
| 6,128,663 A | 10/2000 | Thomas ............... 709/228 |
| 6,188,400 B1 | 2/2001 | House et al. |
| 6,480,890 B1 | 11/2002 | Lee et al. ............ 709/223 |
| 6,487,588 B1 | 11/2002 | Phillips et al. ........ 709/218 |
| 6,711,609 B2 * | 3/2004 | Boyer et al. .......... 709/206 |
| 6,818,489 B2 * | 11/2004 | Kim et al. ............ 438/197 |
| 2001/0039561 A1 * | 11/2001 | Cho .................. 709/200 |

* cited by examiner

US 7,624,161 B1

METHOD AND APPARATUS FOR EMAIL PROGRAMMING ACROSS A COMPUTER NETWORK

RELATED APPLICATIONS

This is a continuation of U.S. patent application Ser. No. 10/720,556 filed Nov. 24, 2003 (now U.S. Pat. No. 7,162, 519), which is a continuation of Ser. No. 10/112,583 filed Mar. 29, 2002 (U.S. Pat. No. 6,678,723), which is a continuation of Ser. No. 09/071,751 filed May 1, 1998 (now U.S. Pat. No. 6,401,114) claiming priority to Provo No. 60/045,261 filed May 1, 1997, with all applications and issued patents incorporated herein by reference and all priorities claimed.

FIELD

The invention relates to a method and apparatus for dynamic programming across a computer network. Specifically, the invention provides for a user on a client computer to select from available logical components on a server computer and to have the selected components assembled into a user program. In this manner, the server computer provides each user on each client computer with customized and dynamic information or tasks.

The invention can be used to execute user-defined remote actions between the server and client across the network. For example, the invention can execute user programs such as publishing pages from several databases, delivering media over the network or managing and controlling a manufacturing site.

BACKGROUND

A computer network (e.g. the world wide web) is used to provide a wide variety of information from server computers to client computers across the globe. The information currently supplied is stored as static pages or is created at the time of request from a merge program that constructs the web page. Conventionally, little if any action is performed by the web servers other than data delivery (e.g. hypertext markup language (HTML) web page publication). This conventional method of supplying static or mail merged pages is very labor intensive since each page is managed as a single unit and published to the requesting client computer as it was originally designed by the programmer. This system does not provide capabilities to re-program the web server to perform different tasks or to provide different information to the client without installing new code or HTML pages on the web server. If a user has specific requirements for the server, the server program must be re-written. If the user's requirements are complex, the task of re-programming the server increases dramatically. Moreover, if other users have different requirements, there is no conventional technique of satisfying the other users. One of the reasons for this is that conventionally the user cannot request a web server across the computer network to be re-assembled as a program to fit his or her specific requirements. What is needed is a system that can address and satisfy the requirements of many users and provide a flexible and customizable server-client relationship.

SUMMARY

The invention provides a method and apparatus for building and assembling programs across a computer network in order to perform required functions for each client. The invention is accomplished by providing an environment that permits the user to assemble programs from components over a computer network (e.g. world wide web) by defining or redefining the necessary logical program components. Thus, the program can then be executed to perform tasks programmed by the user. This is accomplished by constructing logical components that are then called and bound into the program at run time, which alleviates the need to compile the program as a single unit. This action of "binding" logical program components together was not practical until the availability of programming languages like Java that allows this type of "late binding". The foundation that permits this method of page construction or programming is the management of the components for the assembly, requesting, calling and appending of the components to create the user program. Hence, the invention employs several intermediary steps that are executed in the correct sequence by a server program to obtain the desired result.

An embodiment of the invention includes a memory configured to store data for different internal functions, an interface to receive the request of the action to be taken, a processor coupled to the interface and the memory. The system is configured to manipulate the memory based on a set of instructions that are also stored/loaded into memory when a request for that action is executed.

Advantages of the invention includes the ability to produce custom pages or perform complex functions for a requesting client that are significantly different for each client, and can be re-programmed without a compiler across the computer network by the user.

BRIEF DESCRIPTION OF THE FIGURES

The invention will become more readily apparent from the detailed descriptions and the pending claims when taken in conjunction with the drawings, in which:

DETAILED DESCRIPTION

The invention relates to a method and apparatus for dynamic programming across a computer network. The invention includes a method of programming a server computer from a client computer using logical components to build the program. Each logical component has the capability to perform a function that is delivered to the client computer, and which performs tasks that adds value to the overall system.

A. WORLD WIDE WEB ARCHITECTURE

Figure 1:
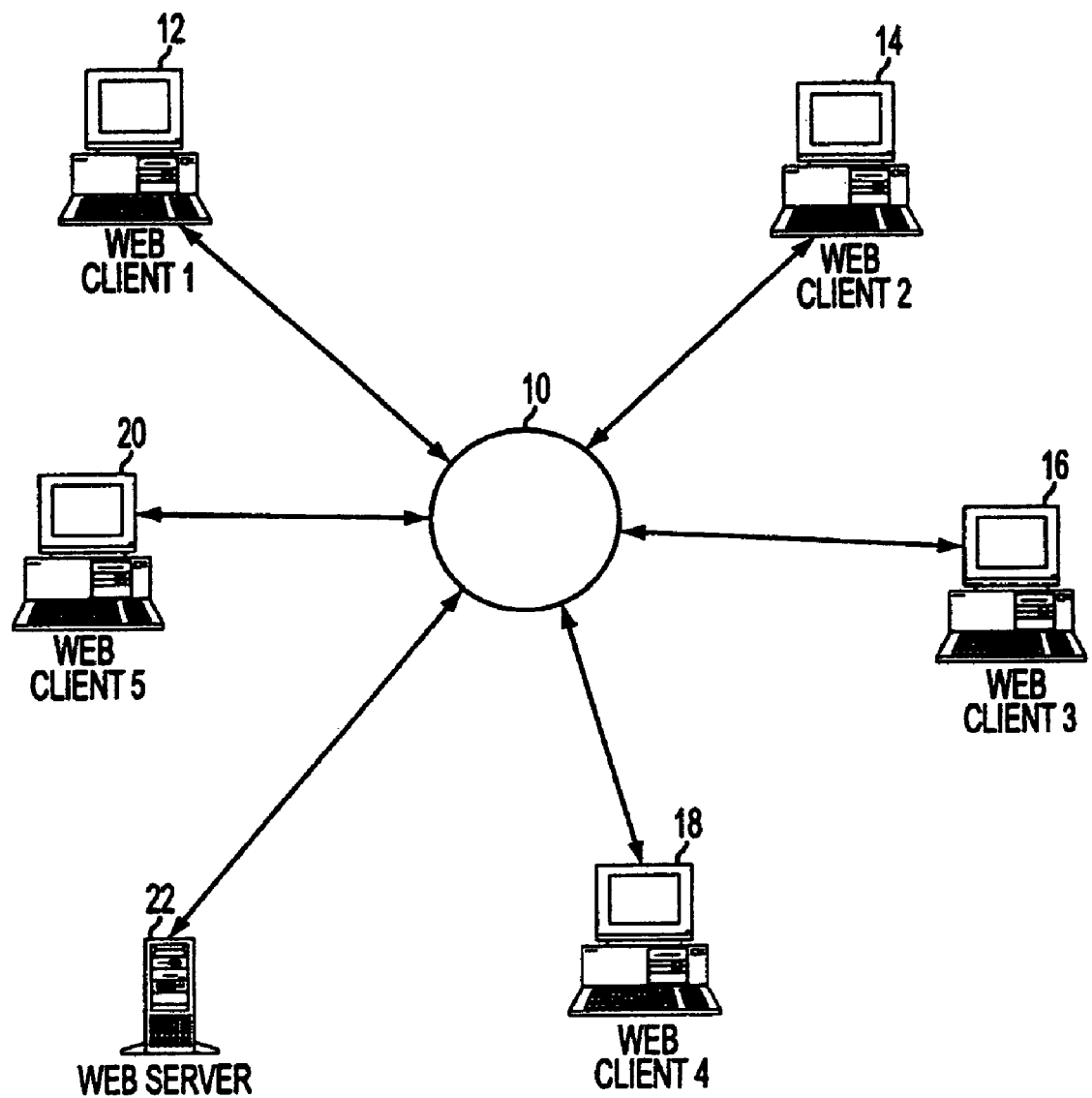
FIG. 1 depicts a network of a server and clients according to the prior art.
Figure 2A:
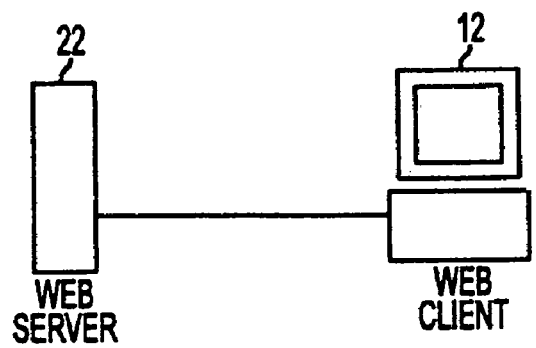
FIGS. 2A-C depict basic server-client functions of delivering information through a web server from a static HTML page or a program that acts as a merger of static HTML and a user profile according to the prior art.
Figure 2B:
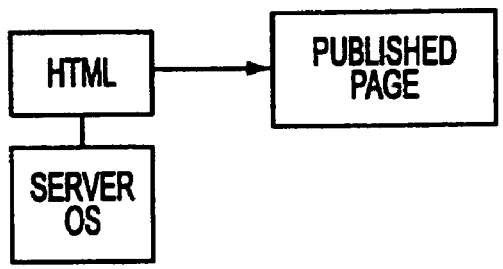
Figure 2C:
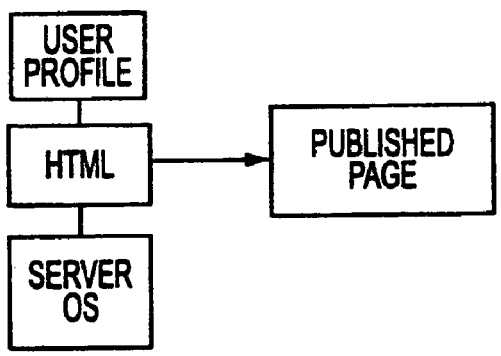
Figure 3:
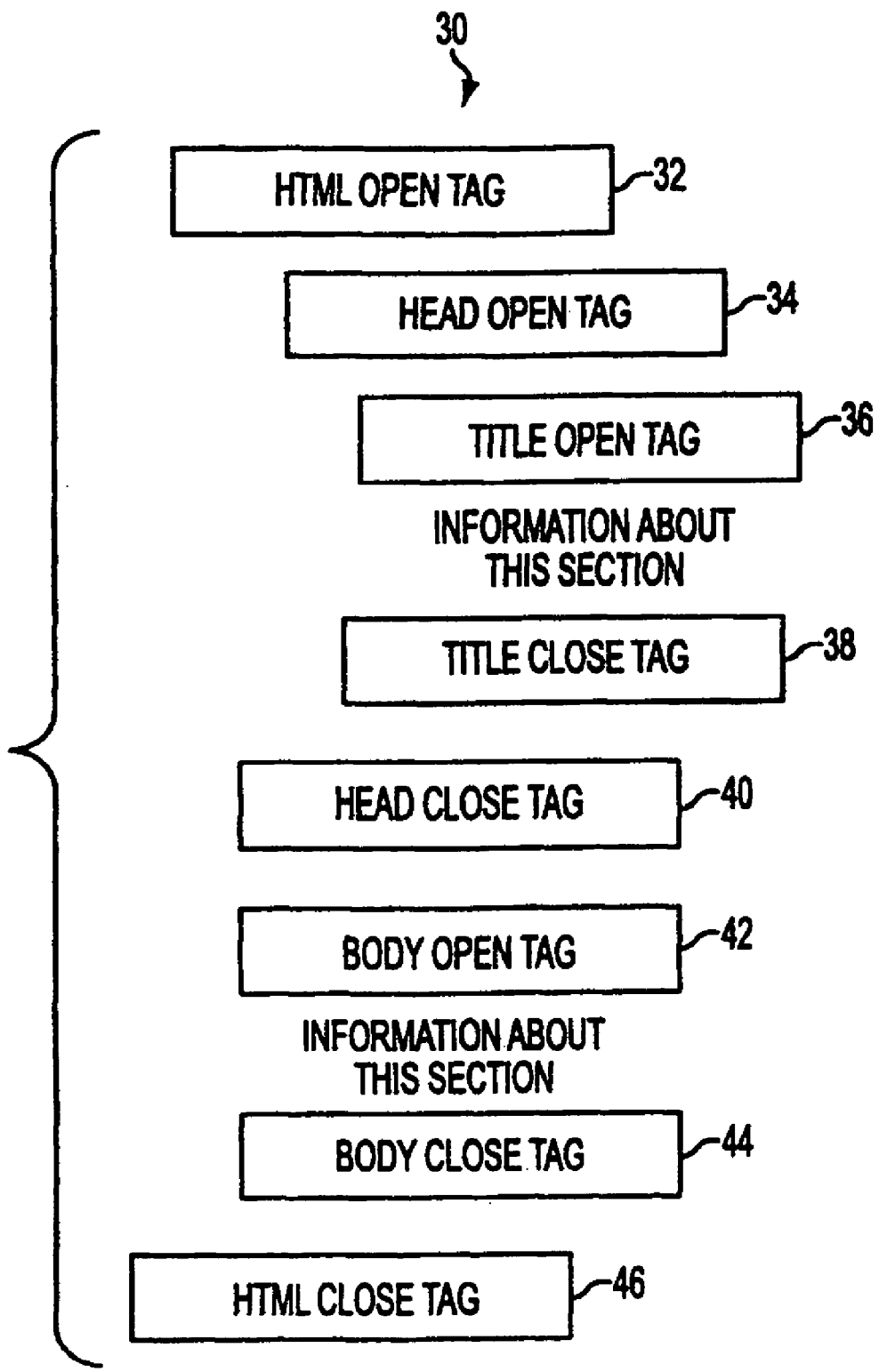
FIG. 3 depicts basic sections of an HTML document according to the prior art.

FIG. 1 depicts a network of a server and clients such as is known on the world wide web and includes a large set of web servers and web clients. The servers are used to store and deliver information over a wide area network (WAN) to clients. FIG. 1 depicts a very small network 10 that contains five clients 12, 14, 16, 18 and 20 and one server 22. The clients normally make requests for information from the server over the network. As shown in FIGS. 2A-2B, the server 22 can publish a static HTML page to the client 12. Alternately, as shown in FIG. 2C, the server 22 can utilize a user profile to publish a customized page to the client 12. If a user profile is employed, the user profile is identified by the user logging onto the server or by the server retrieving client identification by a technique such as cookies (information stored on the client). This process normally uses a template similar to that shown in FIG. 3, and replaces the "tag" with information provided in the user profile. The template shown in FIG. 3 is coded in HTML and displays the open/close HTML tags. The program using this template is requested by the client 12 and the server 22 for the information to be merged and published to the client 12. The server program that performs these tasks including the user interface must be pre-compiled prior to the client making the request. This pre-compilation is a conventional technique that does not allow program steps to be rearranged in order to perform a different task or process.

B. THE SERVER STRUCTURE

Figure 4:
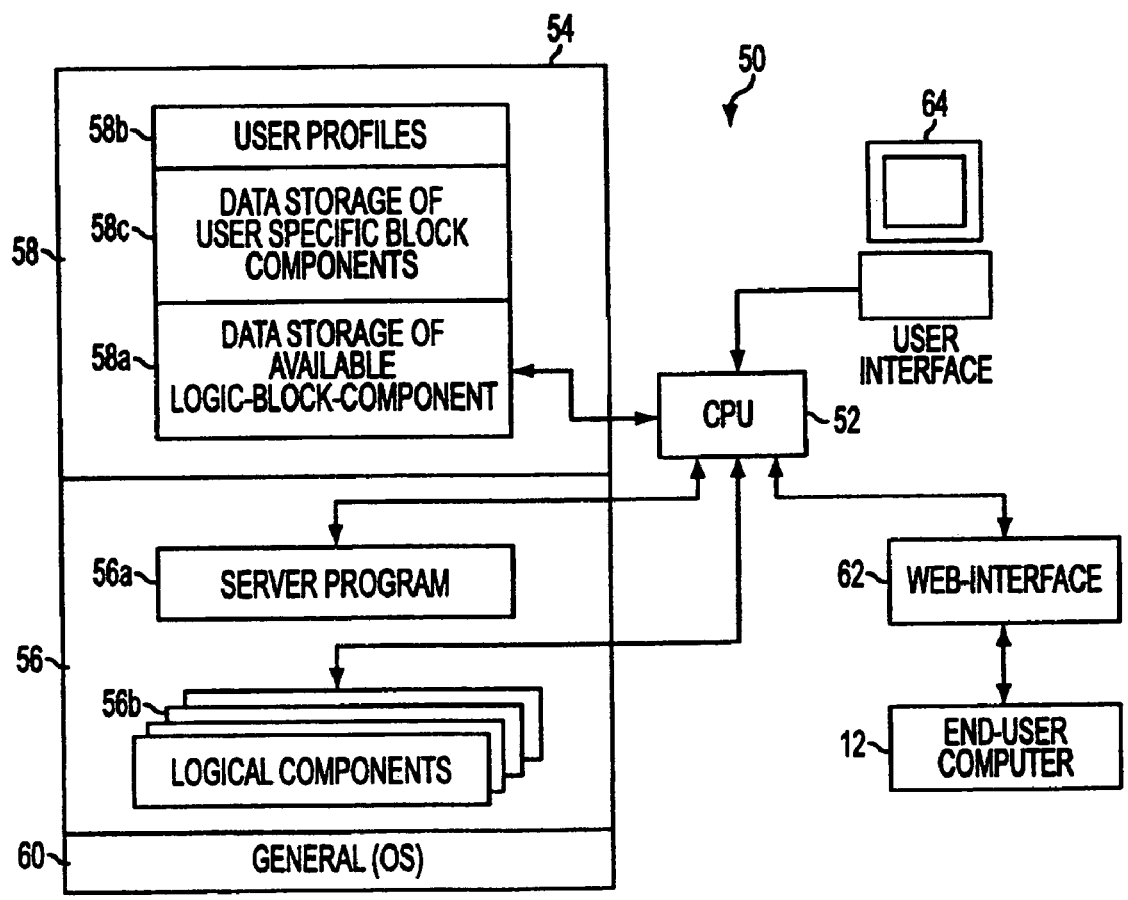
FIG. 4 depicts a computer having data storage, procedure storage, CPU, memory, web server and client (user) interface according to an embodiment of the invention.

The invention employs a computer structure 50 shown in FIG. 4. This structure includes a conventional CPU 52 such as an Intel Pentium running an operating system such as Windows NT or Unix. A memory 54 is connected to the CPU and includes a program portion 56, a data portion 58 and a general portion 60. The program portion 56 includes a server program 56a for program execution and for retrieving logical components 56b to assemble into the user program. The data portion 58 includes an available component portion 58a, a user profile portion 58b and a user specified component portion 58c. By assembling the user specified logical components as described below and sequentially storing pointers in data portion 58c, the server program 56a can execute each user program according to each user's specification, without the need for the user to have a compiler.

The computer structure 50 also includes a web interface 62 for communicating with clients. This interface is configured to receive calls from the clients and to transmit responses to the clients. The server 50 is also a fully functional computer and can become a client to other servers on the network when desired by a user via user interface 64.

C. LOGICAL COMPONENTS

Figure 5:
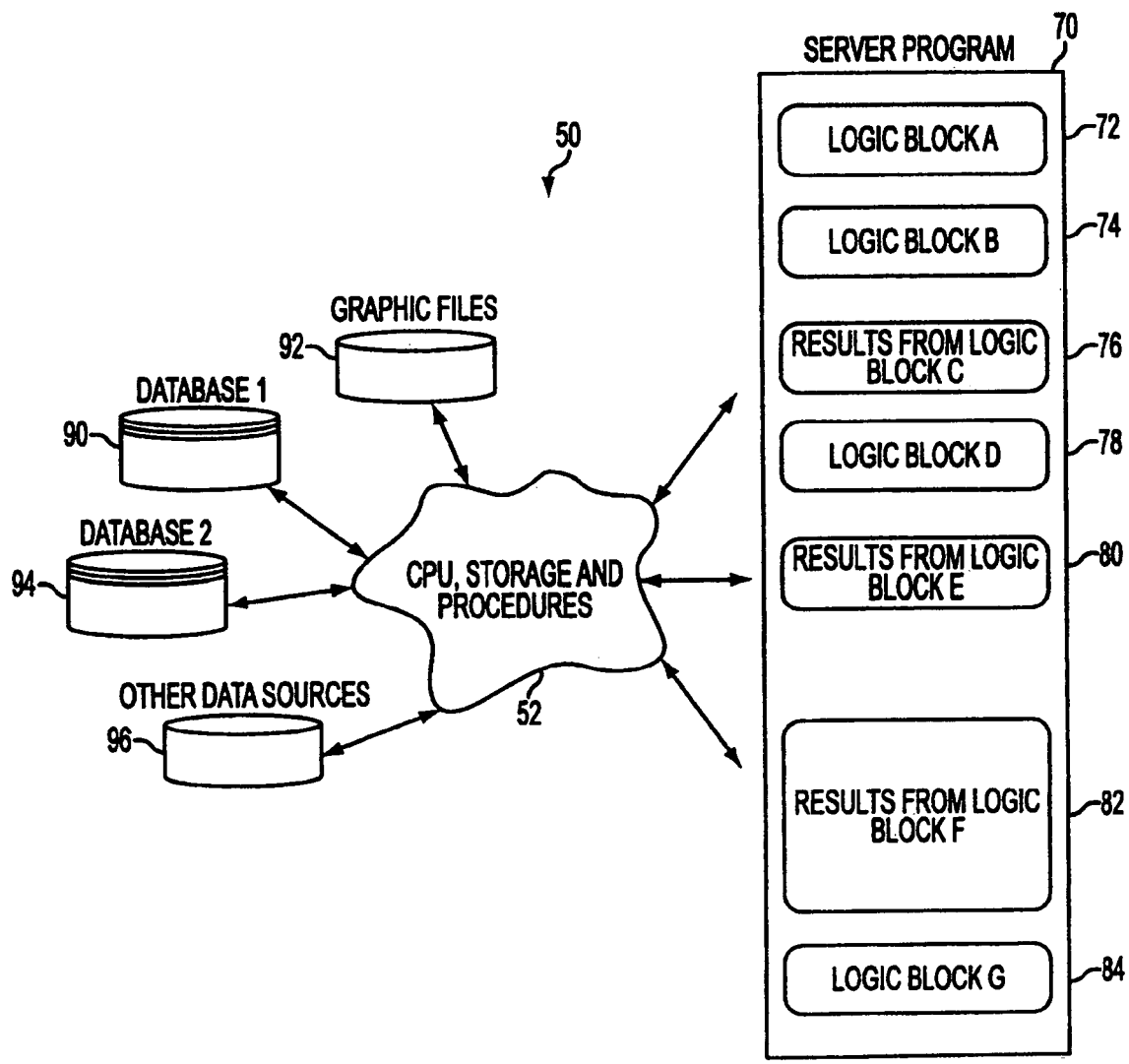
FIG. 5 depicts logical components assembled into a program according to an embodiment of the invention.

FIG. 5 depicts logical components assembled into a user program 70. This assembly of logical components comprises a user program. The exemplary program includes seven components that are assembled to perform a complex process. These components are stored within memory portion 58a and are available to the CPU 52. A reference to each logical component is stored in the user profile memory portion 58b in sequence of the specific user program specified by the user.

An exemplary user profile is shown in Table 1. The user profile is typically retrieved when the user requests execution of their user program.

TABLE 1

| User ID | Program Ref | Logical Component | Sequence |
|---------|-------------|-------------------|----------|
| 1 | P1 | A | 0 |
|   |    | C | 1 |
|   |    | F | 2 |
|   |    | S | 3 |
| 2 | P2 | B | 0 |
|   |    | C | 1 |
|   |    | D | 2 |

Each defined logical component has a contents that define it's identity, features and interface. A typical logical component is depicted in Table 2.

TABLE 2

| | |
|---|---|
| Unique Identifier | |
| Interface Definition | |
| Task - Summarized data for the current month manufacturing workload and output to an HTML format | Action 1 - retrieve input arguments for the current month<br>Action 2 - query database based on arguments<br>Action 3 - sum the results from query<br>Action 4 - format and output summed results in HTML format |
| Exception Handling | |
| Memory Management | |

With regard to the actions, each defined logical component performs a predetermined task. In a manufacturing plant example, the logical components 72 through 84 perform the following tasks shown in Table 3.

TABLE 3

| Logical Component | Task |
|---|---|
| A | Extract data from Database 1 and insert the information in Database 2, new orders for a manufacturing plant |
| B | Query Database 2, for issuance of new work orders to the manufacturing plant |
| C | Summarized data for the current month manufacturing workload and output to an HTML format |
| D | Query Database 2, query for a detailed list for the last 12 months of production, construct a graph of the data and store the graphic file in graphic files 92 |
| E | Output graphic information, in this example, retrieve the latest 12 months production graphic file from 92, output a graphic file |
| F | Query Database 2, output current plant workload and build a detailed list as an HTML table |
| S | Log System Use, log access by this user and store in Database 96 for accounting review and charges for system use |

D. USER SELECTION AND USER PROGRAM ASSEMBLY

Figure 6:
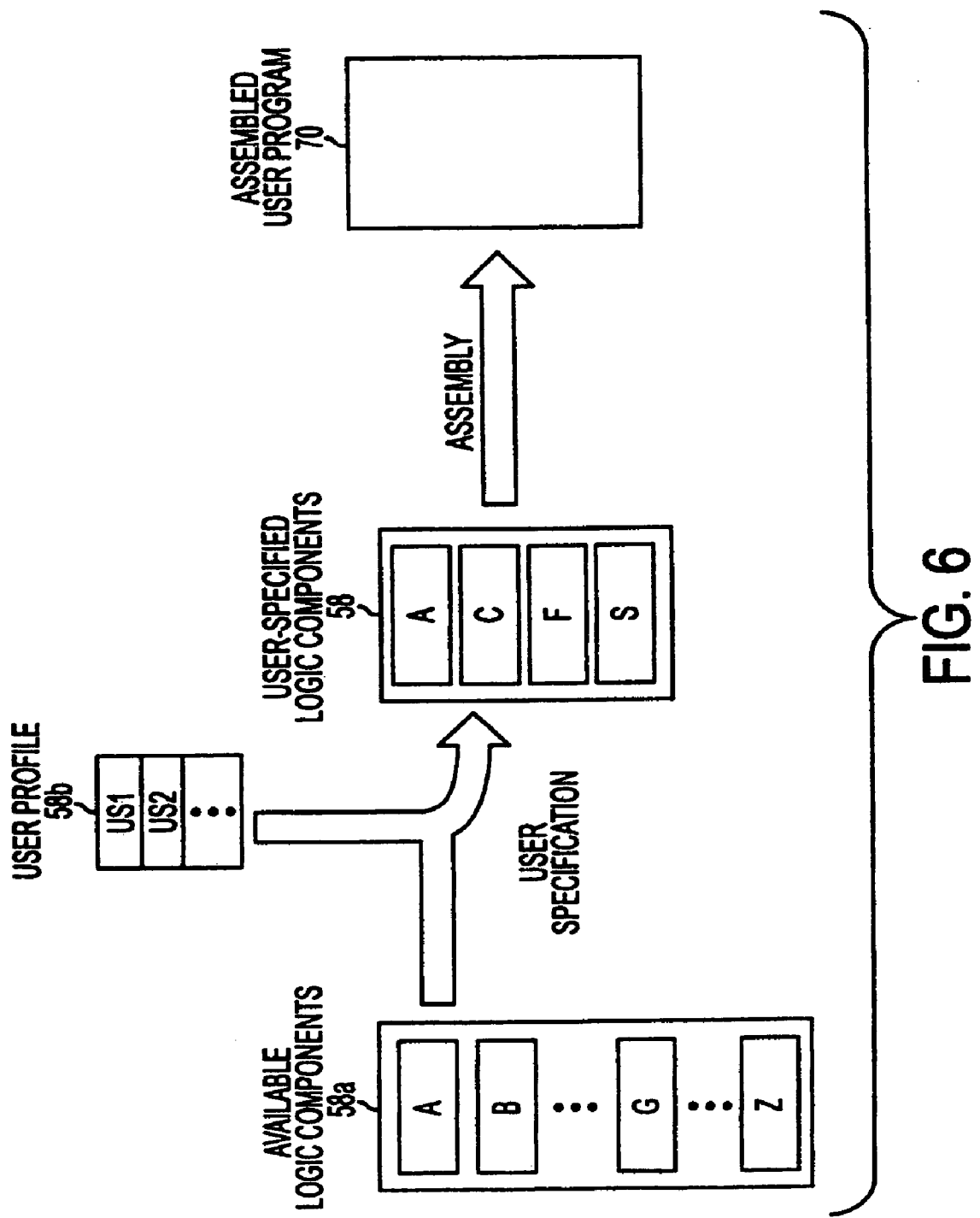
FIG. 6 depicts available logical components, components specified by the user and an assembled user program according to an embodiment of the invention.

FIG. 6 depicts available logical components as stored in memory portion 58a. These components are available for selection by the user in order to build a user program When the user specifies the desired components, the components are arranged in sequence in the memory portion 58b. Once the specified component are arranged, the server program stored in memory portion 60 assembles the specified components and generates the user program 70.

Each example task above represents a logical component. The user program 70 is assembled on the server over the computer network by the user specifying pre-programmed components and then initiating the assembly. These components can also be re-assembled across the network to perform a significantly different task for a different user without having to recompile the server program 56a. The invention is used to perform complex processes defined by the user or the requesting client on the server or a system connected to the server. The invention has the capability of performing actions programmed remotely across a computer network, These actions can be a variety of processes, such as producing pages from several databases or delivering any media that can be transmitted over a computer network or any set of program steps such as managing and controlling a manufacturing site.

Examples of other tasks and sub-tasks are: evaluating values from a chemical analysis; identifying out of range values; formatting the out of range values and valid ranges into a textural message for an user; interrogating a database for a set of e-mail addresses for interested parties regarding test results; and sending an email formatted message to each interested party.

E. SERVER PROGRAM

The server program execution is performed as described below. By constructing-logical components and storing their pointers in sequence in data portion based on the user's profile 58b, the server program can execute each user program without the need to re-compile the server program.

Figure 7:
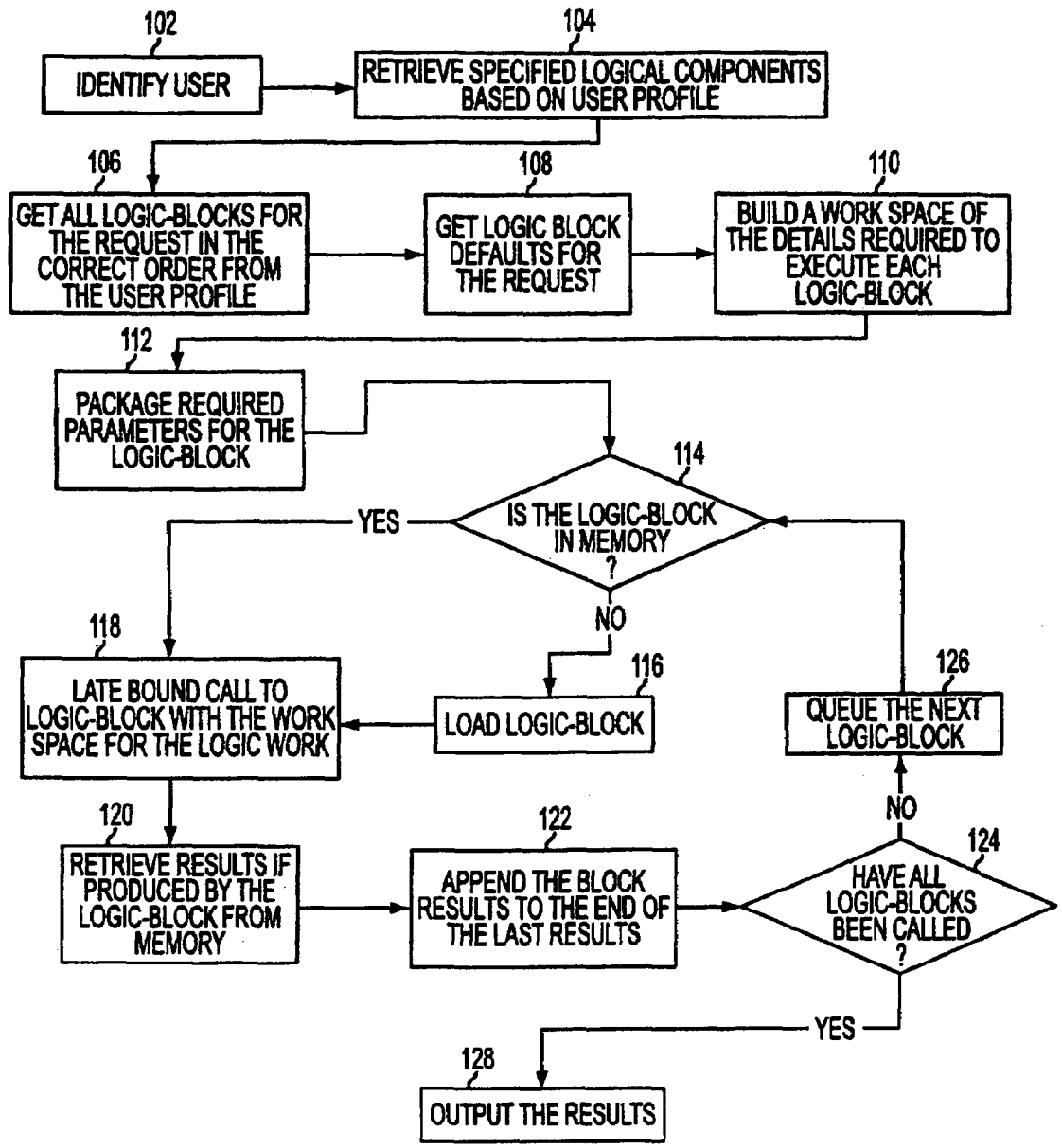
FIG. 7 is a flowchart of the server program according to an embodiment of the invention.

Execution of the logical components requires the base programming language to have the ability to dynamically load, bind and execute pre-built logical component of programming code. FIG. 7 is a flowchart of the server program depicting process steps under an execution of the logical components that are assembled into the user program according to an embodiment of the invention. This flowchart provides details of the actions required to load and execute an user program.

In step 102, the server program identifies the user and retrieves the user profile for that identified user. Step 104 retrieves the specified logical components based on the user profile. Step 106 retrieves the list of logical components that are to be executed in sequence and stored in memory. Step 108 retrieves logical component defaults for the requested program and store in memory. Step 110 allocates a memory work space of required details to execute each logical component. Step 112 packages required parameters and arguments for each logical component. Step 114 determines if the logical component is loaded into memory. Step 116 checks if the logical component is not loaded then it loads the logical component into memory. Step 118 binds the call to the newly loaded logical component and pass the required parameters. Step 120 retrieves the output from the logical component if an output was produced. Step 122 appends the results to any previously constructed results. Step 124 determines if all the logical components have been called. If more logical components need to be called, step 126 queues the next logical component and restarts the execution process at step 114. If all the logical components have been called and executed then step 128 outputs the results of all logical components to the web interface 62 or the user interface 64.

This process describes the server program as it retrieves and binds logical components stored in memory portion 56b to create the user program. Within FIG. 7, steps 106 and 118 are important to insure that the correct program is executed by calling and late-binding the call to the correct logical component.

F. COMPONENT INTERCOMMUNICATION

Each logical component must have a defined interface so that the server program can identify and call it to perform the required task. The logical component can perform any variety of logical task by accessing a data source(s), formatting information, requesting data that the user has entered and acting on that data, such as storing the information into a database. Each logical component can act independently of other requested logical components or act in concert with each other. The independent action of each logical component is important because it allows the assembly of logical components that have been constructed by different programmers and possibly by independent methodologies. This enables the workload for an entire system to be divided among a group of programmers, provided that they follow predetermined interface rules of the server program. The server program and these logical components work in concert to perform the tasks. Because each logical component is called independently, they can access information across a system without concern of interference from other logical components. The following exemplary steps for logical components depicted in Table 4 are generalized from a specific method.

TABLE 4

| Step | Task |
|---|---|
| 1 | Obtain the parameters that have been passed in from the memory work space |
| 2 | React to the parameters provided by the server program |
| 3 | Access a data source and format the information in HTML |
| 4 | Create a work space within memory for the sub-method output |
| 5 | Store results within the work space |
| 6 | Return to the server program |

G. CONCLUSION

Advantages of the invention include the ability for a network client or web-browser to program or re-program a remote server's actions, tasks and methods without a compiler. This allows a variety of tasks to be combined to produce work output that is easily modifiable by the user over a wide area network.

Having disclosed exemplary embodiments and the best mode, modifications and variations may be made to the exemplary embodiments while remaining within the scope of the invention as defined by the following claims.

What is claimed is:

1. A server computer for providing configurable internet email communications for predetermined users from client computers connected to the server computer, the server computer comprising:

a program configured to receive a call from at least one of the predetermined users from the client computers including instructions and designating email recipients;

a memory configured to store a plurality of logic components available for selection by the predetermined users, wherein said logic components are configured to be selected by said predetermined user, each of said logic components including identity, feature, and interface definitions wherein at least one logic component provides a task result and wherein at least one logic component designates a message detailing the task result to be sent as email to email recipients;

a selection procedure configured to:
  receive the instructions from the at least one predetermined user regarding a selection of the available logic components; and
  create a record associating the identified user, and selected logic components; and a server assembly program configured to:
  assemble said selected logic components on said server computer according to the instructions and generate, without recompilation, on said server computer a program which then resides on said server computer; and
  execute said program on said server computer to perform the task and send the emails to the list of designated identified users.

2. The server computer of claim 1, wherein: the server computer is configured to access at least one database containing information provided to at least one of the selected logic components for the at least one identified predetermined user.

3. The server computer of claim 1, wherein at least one of the logic components communicates with another one of the logic components.

4. The server computer of claim 1, wherein the selection procedure stores a profile for each identified predetermined user specifying information from the logic components.

5. A method for providing configurable Internet e-mail communications over a network including a server connected by a network to a plurality of client computers, comprising the steps of:
  receiving a call from a client computer;
  associating said call with a predetermined user of said client computer;
  storing a plurality of logic components available to a plurality of client computer users of said computer network, said logic components created and resident on the server computer and configured to be selected by said predetermined user, each of said logic components including contents that define the component's identity, features and interface and wherein at least one logic component providing a task result and wherein at least one logic component designates a message detailing the task result to be sent as email to email recipients;
  receiving an instruction from said predetermined user regarding a selection of said available logic components and generating a group of selected logic components on said server computer and wherein the instruction includes designated the email recipients;
  assembling said selected logic components on said server computer and generating without recompilation on said server computer a program which then resides on said server computer; and
  executing said program on the server computer and providing emails to the designated email recipients with the task result.

6. The method of claim 5, wherein the associating step includes the step of accessing at least one database containing information for at least one of the selected logic components for the predetermined user.

7. The method of claim 5, wherein at least one logic component communicates with another one of the logic components.

8. The method of claim 5, wherein the step of receiving the instructions from the predetermined user includes the step of storing a profile for the predetermined user specifying at least one logic component for providing information for the email.

9. A computer readable medium located on a server computer and containing a computer program for dynamic programming across a computer network by:
  receiving a call from a client computer;
  associating said call with a predetermined user of said client computer;
  storing a plurality of logic components available to a plurality of client computer users of said computer network, said logic components created and resident on the server computer and configured to be selected by said predetermined user, each of said logic components including contents that define the component's identity, features and interface and wherein at least one logic component providing a task result and wherein at least one logic component designates a message detailing the task result to be sent as email to email recipients;
  receiving an instruction from said predetermined user regarding a selection of said available logic components and generating a group of selected logic components on said server computer and wherein the instruction includes the designated email recipients;
  assembling said selected logic components on said server computer and generating without recompilation on said server computer a program which then resides on said server computer; and
  executing said program on the server computer and providing emails to the designated email recipients with the task result.

10. The medium of claim 9, wherein the associating step includes the step of accessing at least one database containing information for at least one of the selected logic components for the predetermined user.

11. The medium of claim 9, wherein at least one logic component communicates with another one of the logic components.

12. The medium of claim 9, wherein the step of receiving the instruction from the predetermined user includes the step of storing a profile for the predetermined user specifying at least one logic component for providing information for the email.

* * * * *